(12) United States Patent
Wu et al.

(10) Patent No.: US 12,504,473 B2
(45) Date of Patent: Dec. 23, 2025

(54) APPARATUS AND METHOD FOR REMOVING FIXTURE EFFECT

(71) Applicant: National Central University, Taoyuan (TW)

(72) Inventors: Jim-Wei Wu, Taoyuan (TW); Bo-Jun Chen, Taoyuan (TW); Shih-Hao Chien, Taoyuan (TW)

(73) Assignee: National Central University, Taoyuan (TW)

( * ) Notice: Subject to any disclaimer, the term of this patent is extended or adjusted under 35 U.S.C. 154(b) by 156 days.

(21) Appl. No.: 18/605,760

(22) Filed: Mar. 14, 2024

(65) Prior Publication Data

US 2025/0155504 A1    May 15, 2025

(30) Foreign Application Priority Data

Nov. 14, 2023    (TW) ................................. 112143941

(51) Int. Cl.
*G01R 31/319*    (2006.01)
(52) U.S. Cl.
CPC ... *G01R 31/3191* (2013.01); *G01R 31/31905* (2013.01)
(58) Field of Classification Search
CPC .......................... G01R 33/0017; G01R 35/005
See application file for complete search history.

(56) References Cited

U.S. PATENT DOCUMENTS

| | | | |
|---|---|---|---|
| 6,982,561 B2 * | 1/2006 | Scott | G01R 27/32 324/638 |
| 2007/0041512 A1 * | 2/2007 | Pickerd | G01R 35/005 379/30 |

FOREIGN PATENT DOCUMENTS

| | | |
|---|---|---|
| TW | 201219797 A1 | 5/2012 |
| TW | 201303341 A1 | 1/2013 |
| WO | 2010069349 A1 | 6/2010 |

OTHER PUBLICATIONS

Office Action to the corresponding Taiwan Patent Application rendered by the Taiwan Intellectual Property Office (TIPO) on Jun. 18, 2024, 5 pages.

* cited by examiner

*Primary Examiner* — Tung X Nguyen
(74) *Attorney, Agent, or Firm* — Skaar Ulbrich Macari, P.A.

(57) ABSTRACT

An apparatus and method for removing fixture effect are disclosed herein. The device processes the calibration scattering parameters of the 2×-Thru calibration fixture pair through a time domain algorithm. The algorithm consists of time domain gating and ringing data processing to obtain partial S-parameters corresponding to the fixtures on each side of the 2×-Thru calibration fixture pair. The resulting scattering parameters are then substituted into the Mason's gain formula together with other known calibrated scattering parameters to determine all scattering parameters corresponding to the fixture on each side. Finally, in the de-embedding method, the S-parameters of the overall structure and the S-parameters of the fixtures on each side are used to obtain the scattering parameters of the DUT, thereby removing the fixture effect caused by the test fixture pair.

18 Claims, 8 Drawing Sheets

```
┌─────────────────────────────────────────────┐
│ Deriving a first set of calibration         │
│ S-parameters and a second set of            │
│ calibration S-parameters from a first set of│
│ S-parameters through time-domain gating,    │
│ ringing-data processing, and Mason's gain   │
│ formula, thereby performing a fixture       │
│ characterization of a first calibration     │
│ fixture and a second calibration fixture,   │
│ wherein the first set of calibration        │── 701
│ S-parameters corresponds to the first       │
│ calibration fixture of the pair of          │
│ 2x-Thru calibration fixtures, and the       │
│ second set of calibration S-parameters      │
│ corresponds to the second calibration       │
│ fixture of the pair of 2x-Thru calibration  │
│ fixtures, and wherein the first set of      │
│ S-parameters is generated by a test device  │
│ via testing a DUT with a pair of test       │
│ fixtures, and the second set of S-parameters│
│ is generated by the test device via testing │
│ the pair of 2x-Thru calibration fixtures    │
└─────────────────────────────────────────────┘
                       │
                       ▼
┌─────────────────────────────────────────────┐
│ Performing de-embedding processing          │
│ according to the first set of calibration   │
│ S-parameters, the second set of calibration │
│ S-parameters, and a second set of S-        │── 702
│ parameters, thereby generating a set of     │
│ target S-parameters corresponding to the    │
│ DUT only, and then removing a fixture       │
│ effect caused by the pair of test fixtures  │
└─────────────────────────────────────────────┘
```

FIG. 7

APPARATUS AND METHOD FOR REMOVING FIXTURE EFFECT

PRIORITY

This application claims priority to Taiwan Patent Application No. 112143941 filed on Nov. 14, 2023, the entirety of which is incorporated herein by reference.

FIELD

The present invention relates to an apparatus for removing fixture effect and a method for removing fixture effect. More specifically, the present invention relates to an apparatus for removing fixture effect and a method for removing fixture effect which are based on Time-Domain Gating, ringing data processing, and Mason's Gain Formula to construct four-port fixture scattering parameter (also called "S-parameter") characterization.

BACKGROUND

With the rapid developments of precision manufacturing technology, structural design of various electronic instruments (such as printed circuit boards) tends to be complicated and refined, which possibly makes it difficult for test devices (such as a network analyzer and a Vector Network Analyzer (VNA)) to smoothly connect with a device under test (DUT) during testing for performance or yield, e.g., during testing for a non-connectorized DUT. At this point, it is necessary to provide a test fixture between the interface port of the test device and the DUT so as to connect the test device with the DUT.

However, generally, signals from instruments suffer from attenuation and distortion when passing through the test fixture at different frequencies, which affects the accuracy of test results. In other words, the result measured by the test device is actually the joint contribution of the DUT and the test fixture, and the part contributed by the test fixture is the fixture effect. In view of such situation, it is necessary to adopt a fixture compensation technology for improvement by using for example direct compensation, port extension, Short-Open-Thru-Load (SOLT), Through-Reflection-Line (TRL), fixture calibration, or a combination thereof so as to remove the fixture effect.

De-embedding technology is one of many calibration technologies, which belongs to a fixture calibration scheme based on S-parameters. S-parameters serve as an important element for evaluating performance of the DUT and/or the transmission line in the art of the present invention. In the de-embedding technology, the fixture is regarded as an extra network. The de-embedding technology based on 2×-Thru architecture is to add a 2×-Thru area similar to the structure used by the DUT onto the fixture, so that the test device may first measure the 2×-Thru area to get the corresponding S-parameters, and then measure the area containing the DUT to get the corresponding S-parameters (i.e., a test result with fixture effect). Because the 2×-Thru area is architecturally similar to the fixture area used by the DUT, de-embedding processing may be performed according to the S-parameters tested for both the 2×-Thru area and the area containing the DUT, thereby obtaining the S-parameters corresponding to the DUT.

However, even if the 2×-Thru area is architecturally similar to the fixture area used by the DUT, the S-parameters actually measured in the 2×-Thru area cannot be directly regarded as the S-parameters of the fixture part used by the DUT. Accordingly, an urgent need exists in the art to perform accurate fixture characterization on the test fixture so as to improve the effect of fixture effect removal in subsequent de-embedding processing.

SUMMARY

In order to at least solve the technical problems described above, the present invention provides a fixture-effect removal device. The fixture-effect removal device in certain example embodiments comprises a storage and a processor electrically connected with the storage. The storage may be configured to store a first set of scattering parameters (S-parameters) and a second set of S-parameters. The first set of S-parameters is generated by a test device via testing a pair of two-time through (2×-Thru) calibration fixtures, and the second set of S-parameters is generated by the test device via testing a device under test (DUT) with a pair of test fixtures. The processor may be configured to: derive a first set of calibration S-parameters and a second set of calibration S-parameters from the first set of S-parameters through time-domain gating, ringing-data processing, and Mason's gain formula, thereby performing a fixture characterization of a first calibration fixture and a second calibration fixture, wherein the first set of calibration S-parameters corresponds to the first calibration fixture of the pair of 2×-Thru calibration fixtures, and the second set of calibration S-parameters corresponds to the second calibration fixture of the pair of 2×-Thru calibration fixtures. Moreover, the processor may further be configured to perform de-embedding processing according to the first set of calibration S-parameters, the second set of calibration S-parameters, and the second set of S-parameters, thereby generating a set of target S-parameters corresponding to the DUT only, and then removing a fixture effect caused by the pair of test fixtures.

In order to at least solve the technical problems described above, the present invention further provides a fixture-effect removal method. The fixture-effect removal method may be executed by an electronic device, and the electronic device may store a first set of S-parameters and a second set of S-parameters. The first set of S-parameters is generated by a test device via testing a pair of 2×-Thru calibration fixtures, and the second set of S-parameters is generated by the test device via testing a DUT with a pair of test fixtures. The fixture-effect removal method in certain example embodiment may comprise the following steps:

deriving a first set of calibration S-parameters and a second set of calibration S-parameters from the first set of S-parameters through time-domain gating, ringing-data processing, and Mason's gain formula, thereby performing a fixture characterization of a first calibration fixture and a second calibration fixture, wherein the first set of calibration S-parameters corresponds to the first calibration fixture of the pair of 2×-Thru calibration fixtures, and the second set of calibration S-parameters corresponds to the second calibration fixture of the pair of 2×-Thru calibration fixtures, and     performing de-embedding processing according to the first set of calibration S-parameters, the second set of calibration S-parameters, and the second set of S-parameters, thereby generating a set of target S-parameters corresponding to the DUT only, and then removing a fixture effect caused by the pair of test fixtures.

The apparatus for removing fixture effect and the method for removing fixture effect provided herein may extend the traditional two-port fixture characterization method to four ports, thereby providing a novel four-port fixture characterization method. Since time domain data measured by a Time Domain Reflectometry (TDR) may be calculated from the S-parameters measured by the test device (e.g., a network analyzer), in the present invention, the S-parameters of the 2×-Thru structure are converted into TDR at first, then partial S-parameters of the fixtures on both sides are separated by a time-domain gating method, and then the remaining S-parameters are calculated by using Mason's gain formula. Finally, the S-parameters are converted into transfer parameter (also called T-parameters) by using the de-embedding method, and the fixture effect is removed through matrix operation results, thereby obtaining the S-parameters that really correspond to the DUT.

This summary is not intended to encompass all embodiments of the present invention, but is provided only to present the core concept of the present invention in a simple form and as an introduction to the detailed description that follows. The detailed technology and embodiments implemented for the present invention are described in the following paragraphs accompanying the appended drawings for those of ordinary skill in the art to well appreciate the technical features claimed in the present invention.

BRIEF DESCRIPTION OF THE DRAWINGS

The attached drawings are as follows.

The contents shown in FIG. 1 to FIG. 7 are only exemplary examples for illustrating the embodiments of the present invention, and are not intended to limit the scope claimed in the present application.

DETAILED DESCRIPTION

Hereinafter, the apparatus for removing fixture effect and the method for removing fixture effect provided according to the present invention will be explained through the following example embodiments. These example embodiments, however, are not intended to limit the present invention to any environments, applications or implementations described in these example embodiments. Therefore, description of these example embodiments is only for purpose of explaining the present invention rather than for limiting the scope of the present invention. It shall be appreciated that, in the following embodiments and the attached drawings, elements unrelated to the present invention are omitted from depiction; and dimensions of and dimensional scales among individual elements are provided only for illustration, but not to limit the scope of the present invention.

Figure 1:
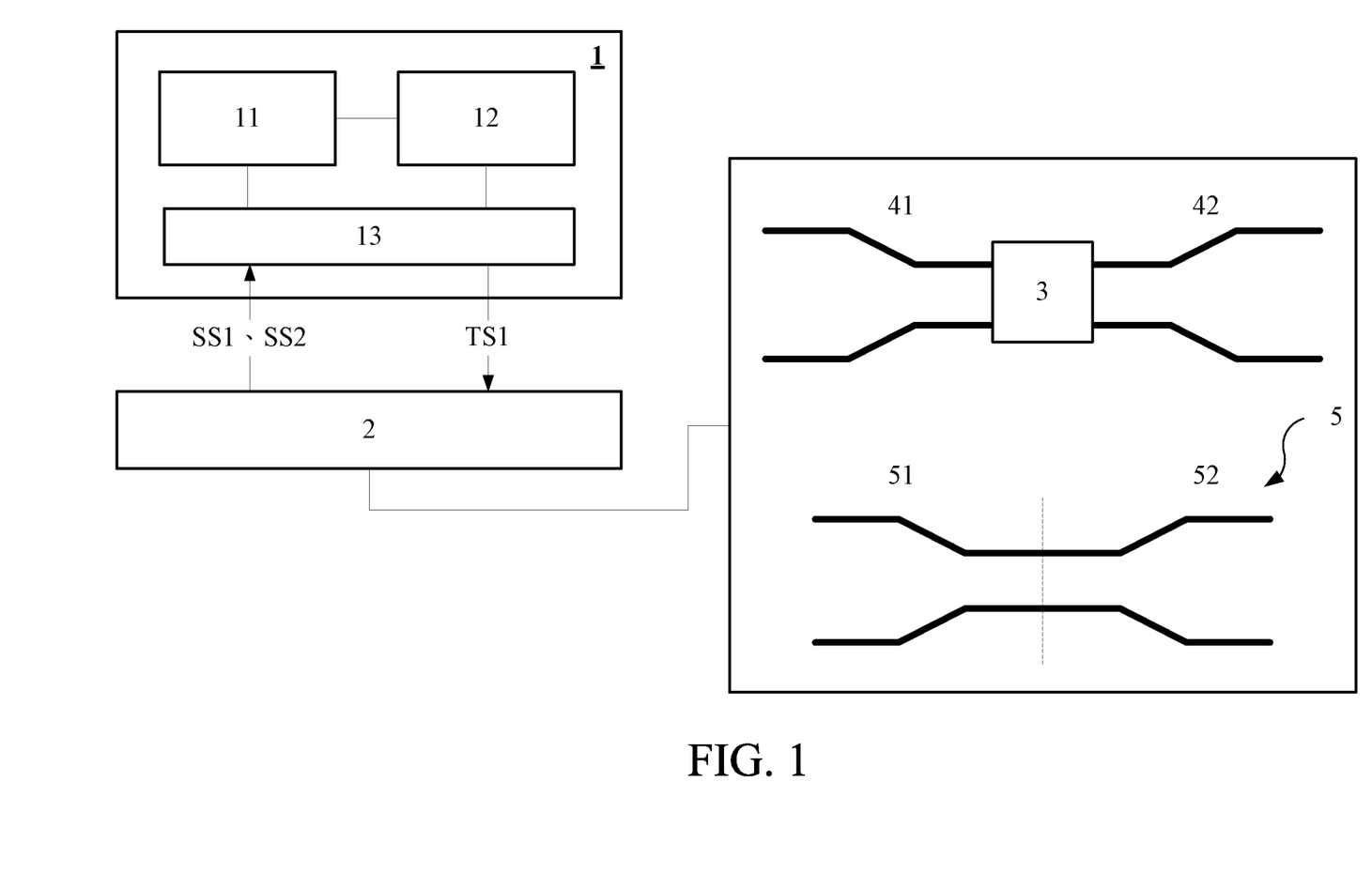
FIG. 1 is a schematic view of a fixture-effect removal device according to one or more embodiments of the present invention.
Figure 2:
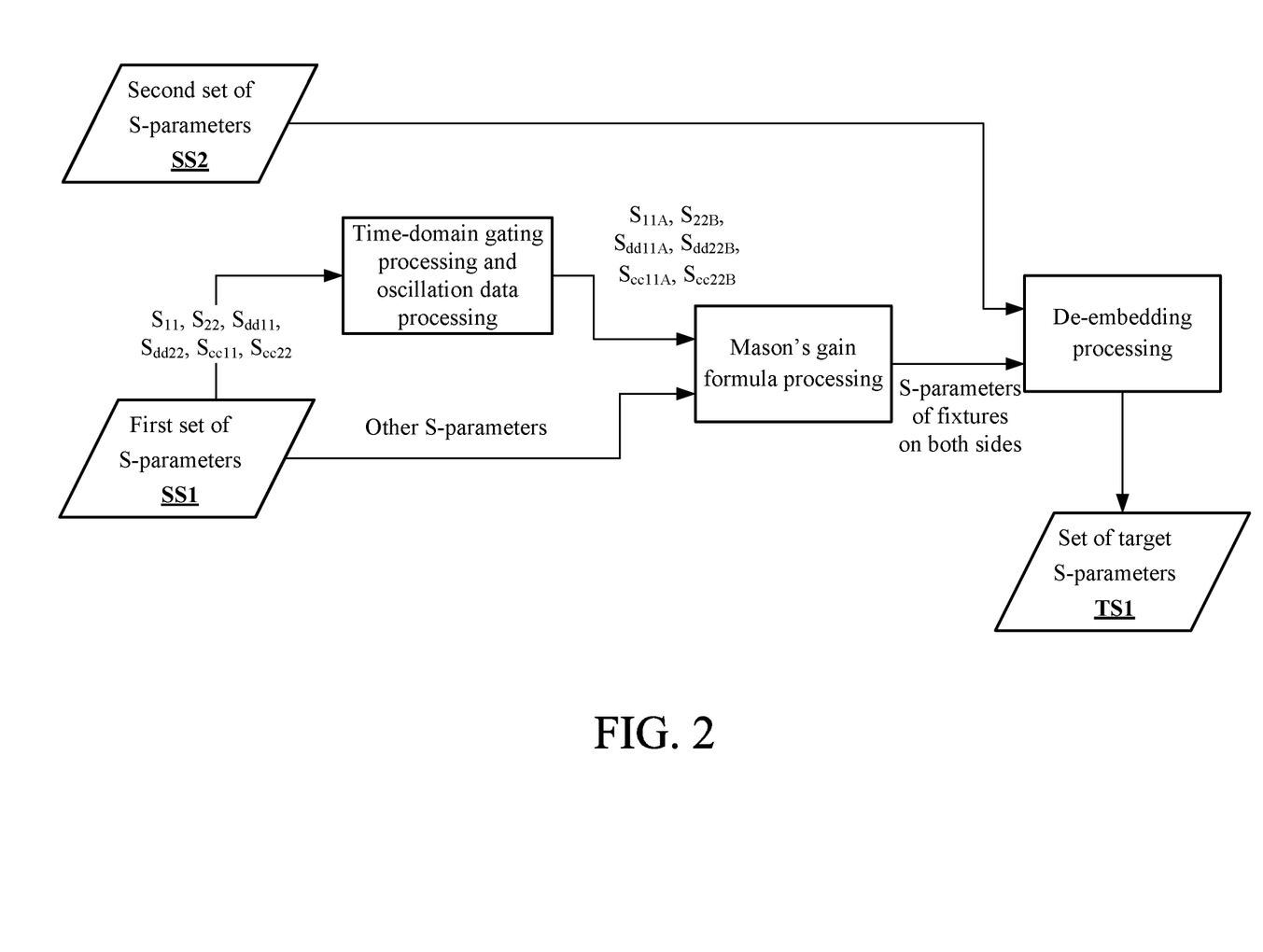
FIG. 2 is a flowchart diagram of performing S-parameter processing to remove the fixture effect by the fixture-effect removal device of FIG. 1.

Referring to FIG. 1, a first embodiment of the present invention is a fixture-effect removal device 1, which may at least comprise a storage 11 and a processor 12, and the storage 11 may be electrically connected with the processor 12. A device under test (DUT) 3 may be electrically connected with a set of fixtures 41 and 42, i.e., being "interposed" between the fixtures 41 and 42, and a test device 2 may test the DUT 3 via the fixtures 41 and 42. More specifically, the test device 2 may perform testing by providing radio frequency (RF) energy to the connected network (for example, the network formed by the DUT 3 and the fixtures 41 and 42) to observe the reflection and transmission results of the RF energy in the network, and integrating the observed information into a corresponding set of S-parameters. For example, the test device 2 may be a network analyzer, a vector network analyzer or other devices.

Another set of fixtures 51 and 52 may form a pair of 2×-Thru calibration fixtures 5, and the fixture-effect removal device 1 may use the pair of calibration fixtures 5 as a whole to eliminate the fixture effect caused by the fixtures 41 and 42 when testing the DUT 3, thereby extracting a set of target S-parameters TS1 that purely corresponds to the DUT 3. The fixtures 51 and 52 may have the same structures and specifications as the fixtures 41 and 42 respectively, so that the subsequent fixture characterization results for the fixtures 51 and 52 are representative enough for the fixtures 41 and 42.

S-parameters serve as an evaluation index of energy scattering results for an "n"-port network in network analysis practice. The "n"-port network may refer to an electronic device with "n" signal ports, and each of the signal ports may be used for receiving and transmitting RF energy. For example, the DUT 3 itself may form a four-port network. The DUT 3 and the fixtures 41 and 42 may also form a four-port network. Although the test device 2 may not be able to test the four-port network formed by the DUT 3 itself due to factors such as structure and location arrangement, it can test the four-port network formed by the fixtures 41 and 42 together with the DUT 3 via the fixtures 41 and 42.

Each S-parameter is a complex number consisting of amplitude and phase. The representation of the S-parameter in a single-ended mode is "$S_{xy}$", wherein "x" represents the reflected port and "y" represents the incident port. For an "n"-port network, the matrix representation of a set of S-parameters thereof in the single-ended mode may be as follows:

$$\begin{bmatrix} b_1 \\ b_2 \\ \vdots \\ b_n \end{bmatrix} = \begin{bmatrix} S_{11} & S_{12} & \ldots & S_{1n} \\ S_{21} & S_{22} & \ldots & S_{2n} \\ \vdots & \vdots & \ddots & \vdots \\ S_{n1} & S_{n2} & \ldots & S_{nn} \end{bmatrix} \begin{bmatrix} a_1 \\ a_2 \\ \vdots \\ a_n \end{bmatrix}$$

wherein "$a_n$" represents the incident power wave at the "n"th port and "$b_n$" represents the reflected power wave at the "n"th port.

Accordingly, the matrix representation of a set of S-parameters for a four-port network in the single-ended mode may be as follows:

$$\begin{bmatrix} b_1 \\ b_2 \\ b_3 \\ b_4 \end{bmatrix} = \begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix} \begin{bmatrix} a_1 \\ a_2 \\ a_3 \\ a_4 \end{bmatrix}$$

wherein S-parameters "$S_{11}$", "$S_{22}$", "$S_{33}$" and "$S_{44}$" located on the diagonal represent return loss; S-parameters "$S_{12}$", "$S_{21}$", "$S_{34}$" and "$S_{43}$" represent insertion loss; S-parameters "$S_{13}$", "$S_{31}$", "$S_{24}$" and "$S_{42}$" represent near-end crosstalk (NEXT), i.e., the signal ratio measured at two near-end ports; S-parameters "$S_{14}$", "$S_{41}$", "$S_{23}$" and "$S_{32}$" represent far-end crosstalk (FEXT), i.e., the signal ratio measured from two ports on different sides.

The representation of S-parameters in a mixed mode is "$S_{abxy}$", wherein "a" and "b" represent signal types of the reflected wave and the transmitted wave respectively ("d" represents difference, "c" represents common mode), "x" represents the reflected port and "y" represents the incident port. Accordingly, the matrix representation of a set of S-parameters for a four-port network in the mixed mode may be as follows:

$$\begin{bmatrix} b_{d1} \\ b_{d2} \\ b_{c1} \\ b_{c2} \end{bmatrix} = \begin{bmatrix} S_{dd11} & S_{dd12} & S_{dc11} & S_{dc12} \\ S_{dd21} & S_{dd22} & S_{dc21} & S_{dc22} \\ S_{cd11} & S_{cd12} & S_{cc11} & S_{cc12} \\ S_{cd21} & S_{cd22} & S_{cc21} & S_{cc22} \end{bmatrix} \begin{bmatrix} a_{d1} \\ a_{d2} \\ a_{c1} \\ a_{c2} \end{bmatrix}$$

The test device 2 may test the DUT 3 through the fixtures 41 and 42, and generate a corresponding second set of S-parameters SS2. The second set of S-parameters SS2 corresponds to the test results from which the fixture effect has not been removed. In addition, the test device 2 may also be electrically connected to the fixtures 51 and 52, so as to generate a first set of S-parameters SS1 corresponding to the pair of calibration fixtures 5 through the mode aiming at the fixtures 41 and 42 and the DUT 3 simultaneously. The first set of S-parameters SS1 may comprise a set of S-parameters corresponding to the single-ended mode and a set of S-parameters corresponding to the mixed mode.

For convenience of explanation, hereinafter the S-parameters corresponding to the single-ended mode in the first set of S-parameters SS1 will be represented as follows by using the above matrix representation:

$$[S] = \begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix}$$

Similarly, the S-parameters corresponding to the mixed mode in the first set of S-parameters SS1 will also be represented as follows by using the above matrix representation:

$$[S^{mm}] = \begin{bmatrix} S_{dd11} & S_{dd12} & S_{dc11} & S_{dc12} \\ S_{dd21} & S_{dd22} & S_{dc21} & S_{dc22} \\ S_{cd11} & S_{cd12} & S_{cc11} & S_{cc12} \\ S_{cd21} & S_{cd22} & S_{cc21} & S_{cc22} \end{bmatrix}$$

The conversion relationships among the S-parameters of the single-ended mode and the mixed mode may be as follows:

$$[S^{mm}] = [M][S][M]^{-1}$$

$$[M] = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix}$$

The storage 11 may be used to store data generated by the fixture-effect removal device 1, data transmitted from external devices to the fixture-effect removal device 1, or data input by users themselves into the fixture-effect removal device 1. The storage 11 may comprise various storage units included in a general computer. For example, the storage 11 may comprise a primary memory (which is also called a main memory or an internal memory), and the processor 12 may directly read instruction sets stored in the primary memory, and execute these instruction sets if needed. The storage 11 may further comprise a secondary memory (which is also called an external memory or an auxiliary memory) which can transmit data stored to the primary memory through a data buffer. The secondary memory may be for example but not limited to a hard disk, an optical disk or the like. The storage 11 may also comprise a tertiary memory, e.g., a pluggable storage device or a cloud hard disk. Specifically, the storage 11 may at least be used to store the second set of S-parameters SS2 and the first set of S-parameters SS1 described above.

The processor 12 may be a microprocessor or a microcontroller capable of signal processing or the like. The microprocessor or the microcontroller is a kind of programmable specific integrated circuit that is capable of operating, storing, outputting/inputting or the like; moreover, the microprocessor or the microcontroller can receive and process various coded instructions, thereby performing various logical operations and arithmetical operations and outputting corresponding operation results. The processor 12 may be programmed to process various instructions and execute various computing tasks or programs in the fixture-effect removal device 1.

One of the overall objectives of the processor 12 is to perform fixture characterization of the four-port network, and mainly to perform fixture characterization of the fixtures 51 and 52. After the characterization of the fixtures 51 and 52 is completed, the processor 12 can accordingly perform de-embedding processing to remove the fixture effect brought by the fixtures 41 and 42, thereby obtaining the set of target S-parameters TS1 which purely corresponds to the DUT 3.

Since the S-parameters measured for the pair of 2×-Thru calibration fixtures 5 are used to represent the combined network formed jointly by the fixtures 51 and 52, the processor 12 needs to distinguish the S-parameters corresponding to the fixture on one single side (i.e., the fixture 51 or the fixture 52). Accordingly, the single-ended mode S-parameters corresponding to the fixtures 51 and 52 may be expressed as "$S_{11A}$" to "$S_{44A}$" and "$S_{11B}$" "$S_{44B}$" respectively, as follows:

$$\begin{bmatrix} S_{11A} & S_{12A} & S_{13A} & S_{14A} \\ S_{21A} & S_{22A} & S_{23A} & S_{24A} \\ S_{31A} & S_{32A} & S_{33A} & S_{34A} \\ S_{41A} & S_{42A} & S_{43A} & S_{44A} \end{bmatrix}$$

-continued $$\begin{bmatrix} S_{11B} & S_{12B} & S_{13B} & S_{14B} \\ S_{21B} & S_{22B} & S_{23B} & S_{24B} \\ S_{31B} & S_{32B} & S_{33B} & S_{34B} \\ S_{41B} & S_{42B} & S_{43B} & S_{44B} \end{bmatrix}$$

Similarly, the mixed-mode S-parameters corresponding to the fixtures 51 and 52 may be expressed as "$S_{dd11A}$" to "$S_{cc22A}$" and "$S_{dd11B}$" to "$S_{cc22B}$" respectively, as follows:

$$\begin{bmatrix} S_{dd11A} & S_{dd12A} & S_{dc11A} & S_{dc12A} \\ S_{dd21A} & S_{dd22A} & S_{dc21A} & S_{dc22A} \\ S_{cd11A} & S_{cd12A} & S_{cc11A} & S_{cc12A} \\ S_{cd21A} & S_{cd22A} & S_{cc21A} & S_{cc22A} \end{bmatrix}$$

$$\begin{bmatrix} S_{dd11B} & S_{dd12B} & S_{dc11B} & S_{dc12B} \\ S_{dd21B} & S_{dd22B} & S_{dc21B} & S_{dc22B} \\ S_{cd11B} & S_{cd12B} & S_{cc11B} & S_{cc12B} \\ S_{cd21B} & S_{cd22B} & S_{cc21B} & S_{cc22B} \end{bmatrix}$$

Figure 3A:
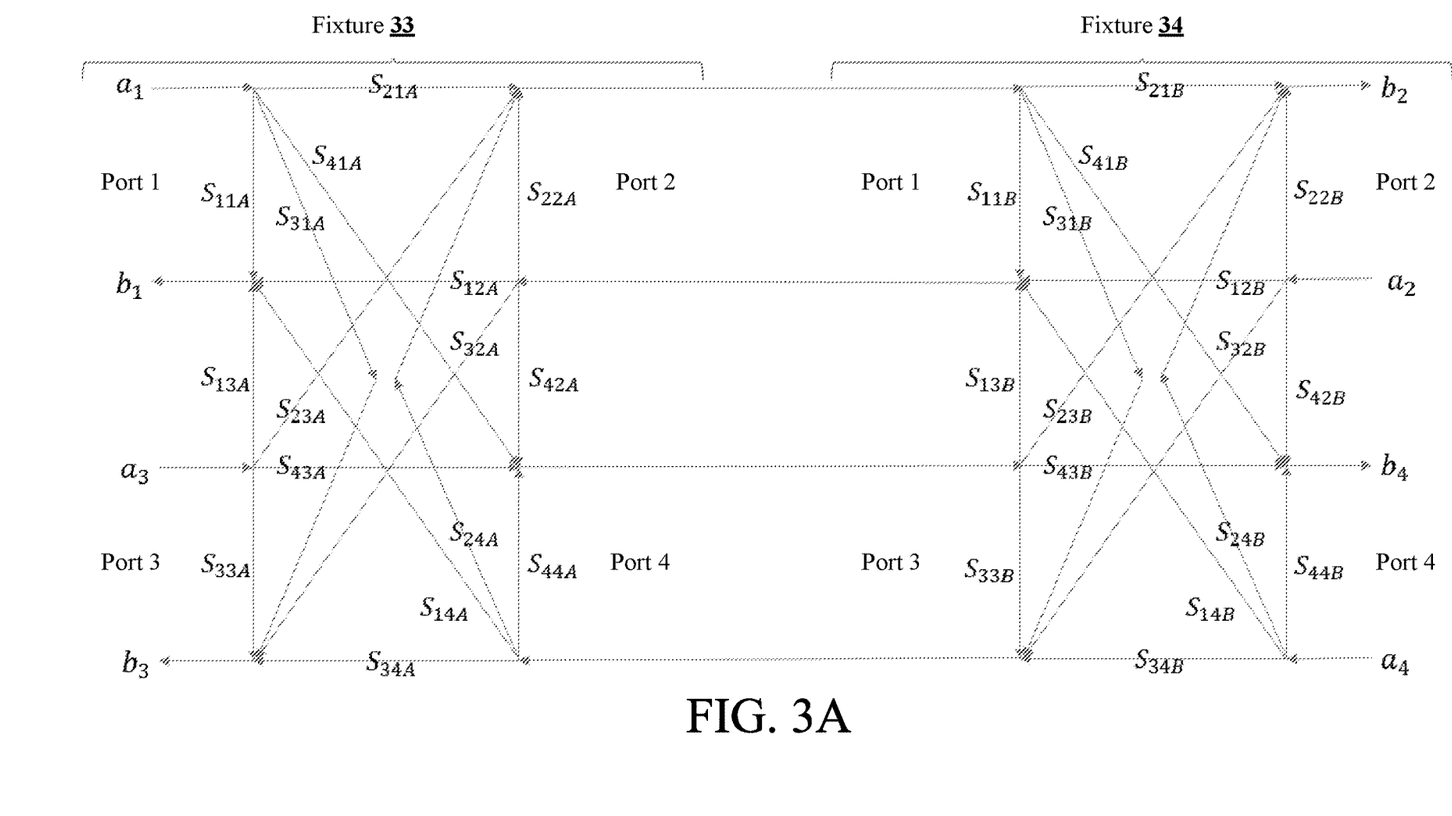
FIG. 3A and FIG. 3B are schematic views of four-port network signal transmission in a single-ended mode and a mixed mode, respectively.
Figure 3B:
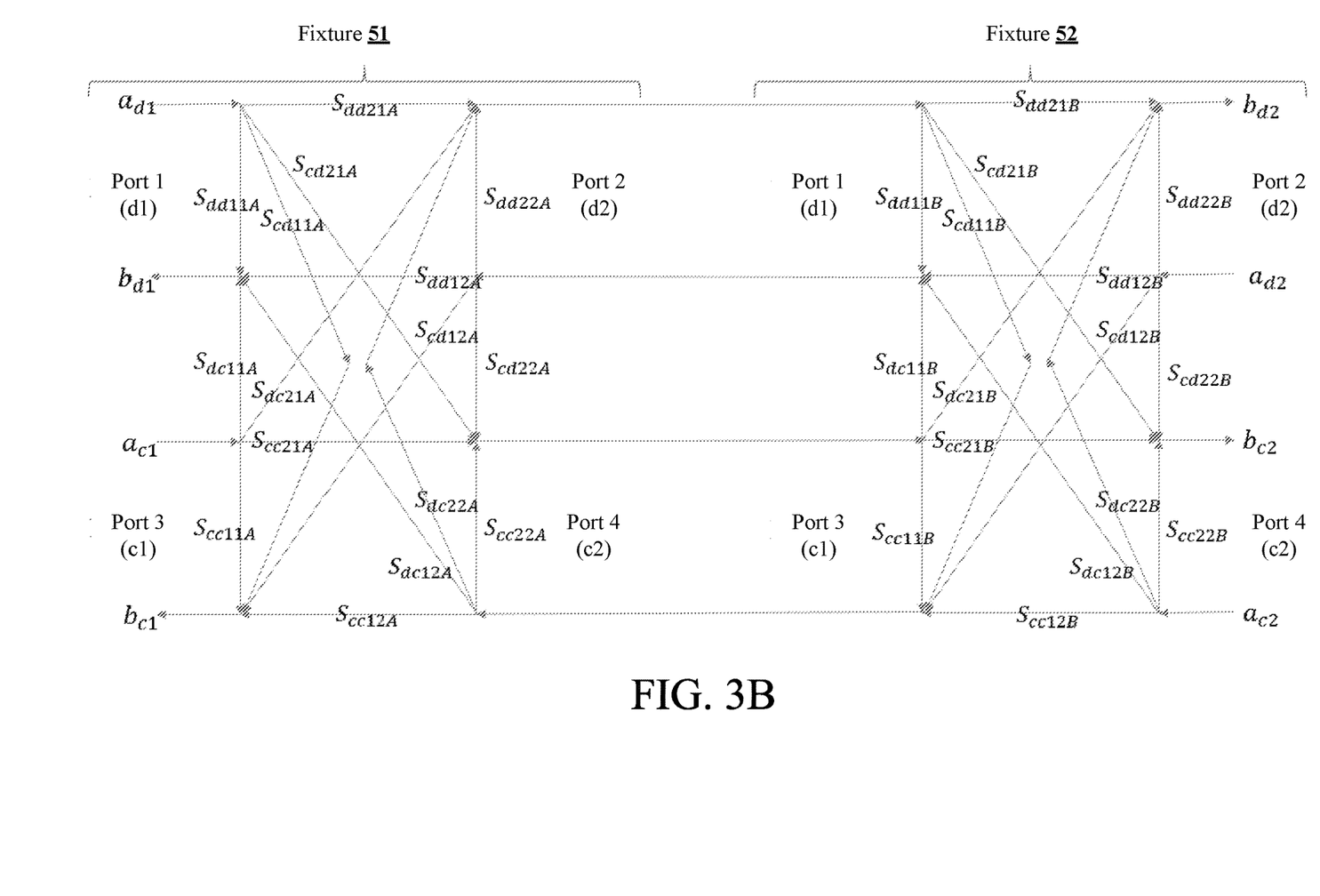

FIG. 3A and FIG. 3B are schematic views of four-port network signal transmission in a single-ended mode and a mixed mode, respectively. Referring to FIG. 3A and FIG. 3B together, as described above for the definition of S-parameters, S-parameters "$S_{11A}$", "$S_{22A}$", "$S_{11B}$" and "$S_{22B}$" represent the return loss in the single-ended mode, while S-parameters "$S_{dd11A}$", "$S_{dd22A}$", "$S_{cc11A}$", "$S_{cc22A}$", "$S_{dd11B}$", "$S_{dd22B}$", "$S_{cc11B}$" and "$S_{cc22B}$" represent the return loss in the mixed mode, and these S-parameters are all denoted by the S-parameter "$S_{RL}$" below. The S-parameters representing the insertion loss are denoted by "$S_{IL}$".

For this purpose, the processor 12 may first convert the return-loss S-parameters and the insertion-loss S-parameters in the first set of S-parameters SS1 into time-domain voltages. Before the conversion, the processor 12 may first perform window processing in a frequency domain through an exponential window function "$W_{exp}$" to increase the accuracy of time-domain response, as shown in the following formula:

$$W_{exp}(f) = C_{w0} + (1 - C_{w0}) \times e^{-\left(\frac{f \times C_{w1}}{f_{max}}\right)^2}$$

wherein "f" is the signal frequency, "$f_{max}$" is the maximum frequency measured for the S-parameter, and "$C_{w0}$" and "$C_{w1}$" are optional coefficients of exponential window. After selecting the coefficients, the processor 12 may perform window processing on the S-parameters and calculate the time-domain voltage by inverse Fourier transformation "$\mathcal{F}^{-1}$" in the formula as follows:

$$S_{RL\_windowed} = S_{RL} \times W_{exp}$$

$$S_{IL\_windowed} = S_{IL} \times W_{exp}$$

$$V_{RL\_impulse}(t) = \mathcal{F}^{-1}\{S_{RL\_windowed}\}$$

$$V_{RL\_step}(t) = \int_0^t V_{RL\_impulse}(t)dt$$

$$V_{IL\_impulse}(t) = \mathcal{F}^{-1}\{S_{IL\_windowed}\}$$

$$V_{IL\_step}(t) = \int_0^t V_{IL\_impulse}(t)dt$$

wherein "$V_{RL\_impulse}$" is the return-loss impulse-response voltage, and the return-loss step-response voltage "$V_{RL\_step}$" is obtained after integration; "$V_{IL\_impulse}$" is the insertion-loss impulse-response voltage, and the insertion-loss step-response voltage "$V_{IL\_step}$" is obtained after integration.

Because the goal of the processor 12 in the time-domain algorithm is to capture the response of half the pair of calibration fixtures 5, the processor 12 needs to find out the time point at which the response reaches half the length of the fixture transmission line. The time point "$t_{half}$" corresponding to half the length of the fixture transmission line may be obtained when the insertion-loss impulse-response voltage (i.e., the "$V_{IL\_impulse}$" described above) reaches the maximum value, i.e., $$t_{half} = t \text{ for } V_{\text{L\_impulse}}(t) = \max(V_{\text{L\_impulse}})$$

Since the quality of the fixtures is not the same, there are different degrees of voltage oscillation in the response of the fixtures. If the voltage is directly captured by the window function, the ringing phenomenon after "$t_{half}$" will be lost, and thus inaccurate response will be obtained. In other words, although the window processing technology improves the dynamic range of time response, it cannot completely eliminate the influence of ringing phenomenon, and thus, it is essential to keep the ringing component in the process of extracting the "$V_{RL\_step}$" described above. For this reason, the processor 12 may divide the voltage into a smooth component and a ringing component, and deal with the smooth component and the ringing component with different strategies respectively.

For the smooth component, the processor 12 may perform smooth processing on the above-mentioned "$V_{RL\_step}$" by adopting local regression fitting quadratic polynomial, and label it as "$V_{RL(OR)\_step}$". The voltage obtained by subtracting the smoothed voltage from the original voltage is regarded as the return-loss ringing voltage "$V_{RL(Ring)\_step}$". The weights of the local regression may be as follows:

$$w_j = \left(1 - \left|\frac{x - x_j}{d}\right|^3\right)^3$$

wherein "x" is a variable, "$x_j$" is a point adjacent to "x", and "d" is the distance from "x" to the farthest "$x_j$".

The quadratic polynomial may be expressed as "$y_i = \beta_0 + \beta_1 x_j + \beta_2 x_j^2$" wherein "$y_j$" and "$x_j$" correspond to "$V_{RL\_step}(t)$" and time "t" respectively. The polynomial model may be rewritten in the matrix form, that is, "Y=Xβ".

The least square method needs to satisfy that "$(Y - X\beta)^T (Y - X\beta)$" is the minimum and estimated solution thereof is "$\beta = (X^T X)^{-1} X^T Y$". For the least square method considering the weight, the weight and polynomial variables are expressed as "$W = \text{diag}(w_1, w_2, \ldots, w_n) = F^T F$", "Y'=FY" and "X'=FX". At this time, the least square method needs to satisfy that "$(Y' - X'\beta)^T (Y' - X'\beta)$" is the minimum, and the solution thereof is:

$$\beta = (X'^T X')^{-1} X'^T Y' = ((FX)^T FX)^{-1} (FX)^T FY = (X^T WX)^{-1} X^T WY$$

Since "extracting half the transmission line response" means that the step response converges to 0 at "$t_{half}$" while "$V_{IL\_step}$" converges from 0 to 1 at "$t_{half}$", "$1-V_{IL\_step}$" is selected as the window function for extracting "$V_{RL(QR)\_step}$" by the time-domain gating method.

For the smooth component "$V_{RL(QR)\_step}$", the processor 12 may perform time-domain gating in two stages. In the first stage, differential operation is performed on "$V_{RL(QR)\_step}$" to obtain the impulse response "$V_{RL(QR)\_impulse}$", and gating is performed for the first time, and then integral operation is performed to obtain the step-response voltage "$V_{RL(QR)\_gatedstep}$" The corresponding equation is as follows:

$$V_{RL(QR)\_impulse}(t) = \frac{d}{dt}(V_{RL(QR)\_step(t)})$$

$$V_{RL(QR)\_gatedimpulse}(t) = V_{RL(QR)\_impulse}(t) \times (1 - V_{IL\_step}(t))$$

$$V_{RL(QR)\_gatedstep}(t) = \int_0^t V_{RL(QR)\_gatedimpulse}(t)\,dt$$

The objective of the above steps is to make the voltage after "$t_{half}$" converge to a certain value.

The processor 12 may then perform gating of the second stage so as to obtain the return-loss smooth step-response voltage $V_{RLhalf(QR)\_step}$ corresponding to half the pair of calibration fixtures 5. For the mixed mode, the equation for the gating performed by the processor 12 may be as follows:

$$V_{RLhalf(QR)\_step}(t) = V_{RL(QR)\_gatedstep}(t) \times (1 - V_{IL\_step}(t))$$

For the single-ended mode, the equation for the gating performed by the processor 12 may be as follows:

$$V_{RLhalf(QR)\_step}(t) = (V_{RL(QR)\_gatedstep}(t) - \Delta V) \times (1 - V_{IL\_step}(t)) + \Delta V$$

wherein "$\Delta V$" is the difference between the voltages of the two modes at "$t_{half}$". So far, the processor 12 has completed the processing for the smooth component through the time-domain gating method.

The ringing component may be obtained by subtracting "$V_{RL(QR)\_step}$" from "$V_{RL\_step}$", and it is expressed as the return-loss ringing step-response voltage "$V_{RL(Ring)\_step}$". As the response of the transmission line gradually converges to "$t_{half}$", the ringing component tends to be stable after "$t_{half}$" and assumes a repetitive waveform similar to cosine wave. As for the ringing component "$V_{RL(Ring)\_step}$", it shall be noted that since the response converges at "$t_{half}$", the processor 12 may replace the responses from "$t_{half}$" to "$3t_{half}$" with stable cosine waves.

During the ringing data processing, the processor 12 may obtain several pieces of time information, including time points "$t_1$" and "$t_2$" at which two voltage maximums appear after "$3t_{half}$" and a time point "$t_3$" at which a voltage maximum appears before "$t_{half}$", and the related equations may be expressed as follows:

$$t_{max1} = t, \text{ for } V_{RL(Ring)\_step}(t) > V_{RL(Ring)\_step}(t \pm T) \text{ and } t > 3t_{half}$$

$$t_1 = \min(t_{max1})$$

$$t_{max2} = t, \text{ for } V_{RL(Ring)\_step}(t) > V_{RL(Ring)\_step}(t \pm T) \text{ and } t > 3t_1$$

-continued $$t_2 = \min(t_{max2})$$

$$t_{max3} = t, \text{ for } V_{RL(Ring)\_step}(t) > V_{RL(Ring)\_step}(t \pm T) \text{ and } t < t_{half}$$

$$t_3 = \max(t_{max3})$$

wherein "T" is the sampling period of the response; the period of the cosine waves used for replacing the original response is "$t_2-t_1$"; and the number of cosine $$\text{"}N = \text{round}\left(\frac{t_2 - t_3}{t_2 - t_1}\right)\text{"}.$$

Then, the processor 12 may modify the ringing component as follows:

$$\overline{V}_{RLhalf(Ring)\_step}(t) = \begin{cases} c_0 \times \cos\left(\frac{\pi(t - c_2)}{c_3}\right) + c_1, t_3 < t < t_1 \\ V_{RL(Ring)\_step}(t), t \le t_3 \text{ and } t \ge t_1 \end{cases}$$

$$c_0 = V_{RL(Ring)\_step}(t1), c_1 = 0, c_2 = t_1, c_3 = \frac{t_2 - t_3}{2 \times N}$$

Because "$\overline{V}_{RLhalf(Ring)\_step}(t)$" usually has discontinuous points at "$t_3$", the processor 12 may find out the time point "$t_4$" at which the voltage maximum appears after "$t_3$", as shown below:

$$t_{max4} = t, \text{ for } \overline{V}_{RLhalf(Ring)\_step}(t) > \overline{V}_{RLhalf(Ring)\_step}(t \pm T) \text{ and } t > t_3$$

$$t_4 = \min(t_{max4})$$

Then, the processor 12 may smooth the voltage values from "$t_3$" to "$t_4$" with cosine waves:

$$V_{Cosine}(t) = c_0 \times \cos\left(\frac{\pi(t - c_2)}{c_3}\right) + c_1$$

$$V_{RLhalf(Ring)\_step}(t) = \begin{cases} \overline{V}_{RLhalf(Ring)\_step}(t) \times \frac{V_{Cosine}(t)}{\overline{V}_{RLhalf(Ring)\_step}(t_4)}, t_3 < t < t_4 \\ \overline{V}_{RLhalf(Ring)\_step}(t), t \le t_3 \text{ and } t \ge t_4 \end{cases}$$

$$c_0 = \frac{\overline{V}_{RLhalf(Ring)\_step}(t_3) - \overline{V}_{RLhalf(Ring)\_step}(t_4)}{2}$$

$$c_1 = \frac{\overline{V}_{RLhalf(Ring)\_step}(t_3) - \overline{V}_{RLhalf(Ring)\_step}(t_4)}{2}$$

$$c_2 = t_3$$

$$c_3 = t_4 - t_3$$

So far, the processor 12 has finished the processing of the ringing component through the ringing data processing.

Next, the processor 12 may add the smooth component with the ringing component that have been processed to obtain the transmission line response of half the pair of calibration fixtures, as follows:

$$V_{RLhalf\_step}(t) = V_{RLhalf(QR)\_step}(t) + V_{RLhalf(Ring)\_step}(t)$$

The processor 12 may perform differential processing on the step response to obtain an impulse response, and perform Fourier transformation on the impulse response to obtain new S-parameters, and the process is as follows:

$$V_{RLhalf\_impulse}(t) = \frac{d}{dt}(V_{RLhalf\_step}(t))$$

$$S_{RLhalf\_windowed} = \mathcal{F}\{V_{RLhalf\_impulse}(t)\}$$

Since the aforementioned time-domain calculation processes are all S-parameter calculation based on window processing, the processor 12 finally needs to divide the windowed parameters by the window function again to obtain the correct S-parameters, as shown below:

$$S_{RLhalf} = \frac{S_{RLhalf\_windowed}}{W_{exp}}$$

Figure 4:
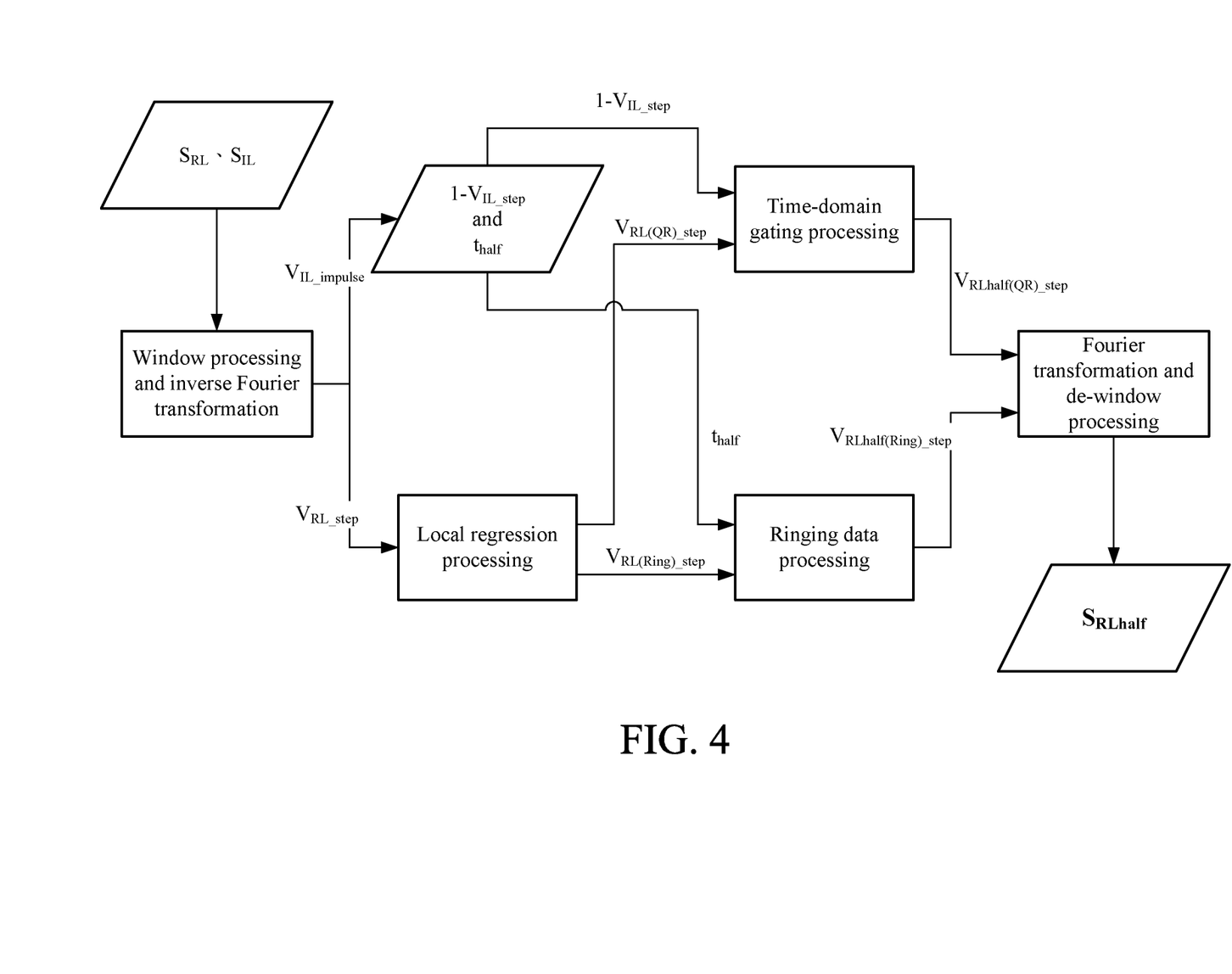
FIG. 4 is a flowchart diagram of performing time-domain processing on partial S-parameters by the fixture-effect removal device of FIG. 1.

To sum up, the overall process of time-domain operation may be as shown in FIG. 4. Through time-domain calculation, the processor 12 may extract the S-parameter $S_{RL}$ representing the return loss to obtain the S-parameter $S_{RLhalf}$. More specifically, in the single-ended mode, among the first set of S-parameters SS1, the S-parameter "$S_{11}$" may be calculated to obtain the S-parameter $S_{11A}$ shown in FIG. 3A, and the S-parameter "$S_{22}$" may be calculated to obtain the S-parameter $S_{22B}$ shown in FIG. 3A. In the mixed mode, among the first set of S-parameters SS1, the S-parameter "$S_{dd11}$" may be calculated as above to obtain the S-parameter $S_{dd11A}$ shown in FIG. 3B, the S-parameter "$S_{dd22}$" may be calculated as above to obtain the S-parameter $S_{dd22B}$ shown in FIG. 3B, "$S_{cc11}$" may be calculated as above to obtain the S-parameter $S_{cc11A}$ shown in FIG. 3B, and "$S_{cc22}$" may be calculated as above to obtain the S-parameter $S_{cc22B}$ shown in FIG. 3B.

Figure 5:
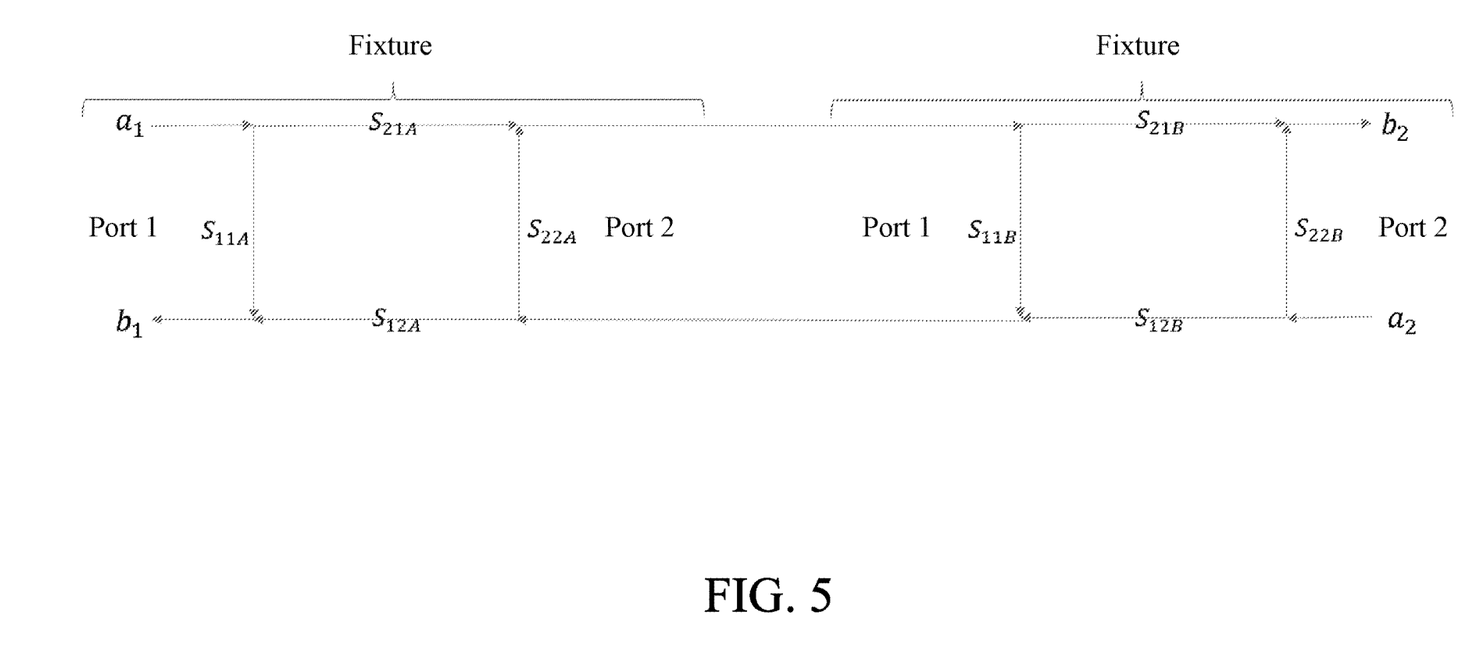
FIG. 5 is a schematic view of signal transmission for a two-port network.

After six return-loss S-parameters are calculated by the time-domain operation, the remaining S-parameters will be solved by the processor 12 through the Mason's gain formula. FIG. 5 illustrates a flowchart diagram for signals of a two-port fixture. First, the S-parameters of the two-port fixture have the following relationships:

$$S_{11} = S_{11A} + \frac{S_{21A} \cdot S_{11B} \cdot S_{12A}}{1 - S_{11B} \cdot S_{22A}}$$

$$S_{21} = \frac{S_{21A} \cdot S_{21B}}{1 - S_{11B} \cdot S_{22A}}$$

$$S_{12} = \frac{S_{12A} \cdot S_{12B}}{1 - S_{11B} \cdot S_{22A}}$$

$$S_{22} = S_{22B} + \frac{S_{12B} \cdot S_{22A} \cdot S_{21B}}{1 - S_{11B} \cdot S_{22A}}$$

If the insertion loss of the fixtures on both sides is assumed to be the same, i.e., "$S_{12A}=S_{21B}$", then the S-parameter $S_{21}$ representing the insertion loss may be modified as follows:

$$S_{21} = \frac{S_{21A} \cdot S_{12A}}{1 - S_{11B} \cdot S_{22A}}$$

which may be then substituted to the equation of "$S_{11}$" to obtain:

$$S_{11B} = \frac{S_{11} - S_{11A}}{S_{21}}$$

Similarly, the S-parameter $S_{12}$ representing the insertion loss may be modified into:

$$S_{12} = \frac{S_{21B} \cdot S_{12B}}{1 - S_{11B} \cdot S_{22A}}$$

which may be then substituted to the equation of "$S_{22}$" to obtain:

$$S_{22A} = \frac{S_{22} - S_{22B}}{S_{12}}$$

Because the fixtures are passive elements, the network thereof has reciprocity, that is, "$S_{12A}$" will be equal to "$S_{21A}$", and "$S_{12B}$" will be equal to "$S_{21B}$". Therefore, the insertion loss of the fixtures on both sides may be calculated as follows:

$$S_{12A} = S_{21A} = S_{12B} = S_{21B} = \sqrt{S_{21} \cdot (1 - S_{11B} \cdot S_{22A})}$$

For a four-port network in the single-ended mode, the methods for calculating the S-parameters "$S_{11B}$" and "$S_{22A}$" representing the return loss and the S-parameters representing the insertion loss are the same as those for a two-port network. For a four-port network in the mixed-mode, the methods for calculating the S-parameters representing the return loss and the insertion loss are also the same as those for the single-ended mode, and the equations thereof may be expressed as follows:

$$S_{dd11B} = \frac{S_{dd11} - S_{dd11A}}{S_{dd21}}$$

$$S_{dd22A} = \frac{S_{dd22} - S_{dd22B}}{S_{dd12}}$$

$$S_{dd12A} = S_{dd21A} = S_{dd12B} = S_{dd21B} = \sqrt{S_{dd21} \cdot (1 - S_{dd11B} \cdot S_{dd22A})}$$

$$S_{cc11B} = \frac{S_{cc11} - S_{cc11A}}{S_{cc21}}$$

$$S_{cc22A} = \frac{S_{cc22} - S_{cc22B}}{S_{cc12}}$$

$$S_{cc12A} = S_{cc21A} = S_{cc12B} = S_{cc21B} = \sqrt{S_{cc21} \cdot (1 - S_{cc11B} \cdot S_{cc22A})}$$

According to the relationships between the single-ended mode and the mixed mode, the crosstalk may be calculated by using the following equations:

$$S_{dc11A} = S_{cd11A} = S_{11A} - \frac{S_{dd11A} + S_{cc11A}}{2}$$

$$S_{dc22B} = S_{cd22B} = S_{22B} - \frac{S_{dd22B} + S_{cc22B}}{2}$$

$$S_{dc11B} = S_{cd11B} = S_{11B} - \frac{S_{dd11B} + S_{cc11B}}{2}$$

-continued $$S_{dc22A} = S_{cd22A} = S_{22A} - \frac{S_{dd22A} + S_{cc22A}}{2}$$

$$S_{dc12A} = S_{dc21A} =$$

$$S_{cd12A} = S_{cd21A} = S_{dc12B} = S_{dc21B} = S_{cd12B} = S_{cd21B} = S_{12A} - \frac{S_{dd12A} + S_{cc12A}}{2}$$

According to the above operation, the processor 12 can obtain all single-ended mode S-parameters corresponding to the fixtures 51 and 52, i.e., "$S_{11A}$" to "$S_{44A}$" and "$S_{11B}$" to "$S_{44B}$", and all mixed mode S-parameters, i.e., "$S_{dd11A}$" to "$S_{cc22A}$" and "$S_{dd11B}$" to "$S_{cc22B}$". In other words, the processor 12 has completed the fixture characterization of the four-port network.

Subsequently, that processor 12 may perform de-embedding processing based on the calculated S-parameters of the fixtures 51 and 52. Specifically, the processor 12 may convert the S-parameters respectively corresponding to the fixtures 51 and 52 into transfer parameters (also called "T parameters"), and the structure thereof is as follows. Since the conversion method between the S-parameters and the transfer parameters is well known to those of ordinary skill in the art, this will not be further described herein.

$$[T] = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix}$$

The corresponding relationships between the transfer parameters corresponding to the fixtures 41 and 42 on both sides and the transfer parameters corresponding to the fixtures 41 and 42 and the DUT 3 are as follows:

$$[T_{Total}] = [T_A] \times [T_{DUT}] \times [T_B]$$

wherein "$[T_A]$" represents a set of transfer parameters corresponding to the fixture 41; "$[T_B]$" represents a set of transfer parameters corresponding to the fixture 42; "$[T_{DUT}]$" represents a set of transfer parameters corresponding to the fixtures 41 and 42 and the DUT 3.

According to the above relationships, the processor 12 may obtain the set of transfer parameters corresponding to the DUT 3 through matrix operation, as shown below:

$$[T_{DUT}] = [T_A]^{-1} \times [T_{Total}] \times [T_B]^{-1}$$

Finally, the processor 12 may convert each of the transfer parameters in the set of transfer parameters back into the S-parameters, thereby obtaining 16 S-parameter values purely corresponding to the DUT 3, i.e., successfully removing the fixture effect caused by the fixtures 41 and 42.

In some embodiments, since the second set of S-parameters SS2 and the first set of S-parameters SS1 stored in the storage 11 are received from the test device 2, the fixture-effect removal device 1 may further comprise a transceiver 13 to receive the above data. The transceiver 13 may be electrically connected with the storage 11 and the processor 12, and may be used for wired or wireless communication with external devices. Taking wireless communication as an example, the transceiver 13 may comprise, but not limited to, an antenna, an amplifier, a modulator, a demodulator, a detector, an analog-to-digital converter, a digital-to-analog converter and other communication elements. Taking wired communication as an example, the transceiver 13 may be for example, but not limited to, a gigabit Ethernet transceiver, a gigabit interface converter (GBIC), a small form-factor pluggable (SFP) transceiver, a ten gigabits small form-factor pluggable (XFP) transceiver or the like. In addition to receiving the second set of S-parameters SS2 and the first set of S-parameters SS1 from the test device 2, the transceiver 13 may also transmit the set of target S-parameters TS1 extracted by the processor 12 and purely corresponding to the DUT 3 to the test device 2.

Results of experiments conducted by the inventors show that the S-parameters characterized by the processor 12 have certain accuracy below 20 GHz. Even after the de-embedding processing, the insertion loss of the mixed mode can exhibit accurate performance at a frequency as high as 30 GHz, so that the performance of the DUT 3, such as the transmission efficiency thereof, can be effectively evaluated.

Figure 6:
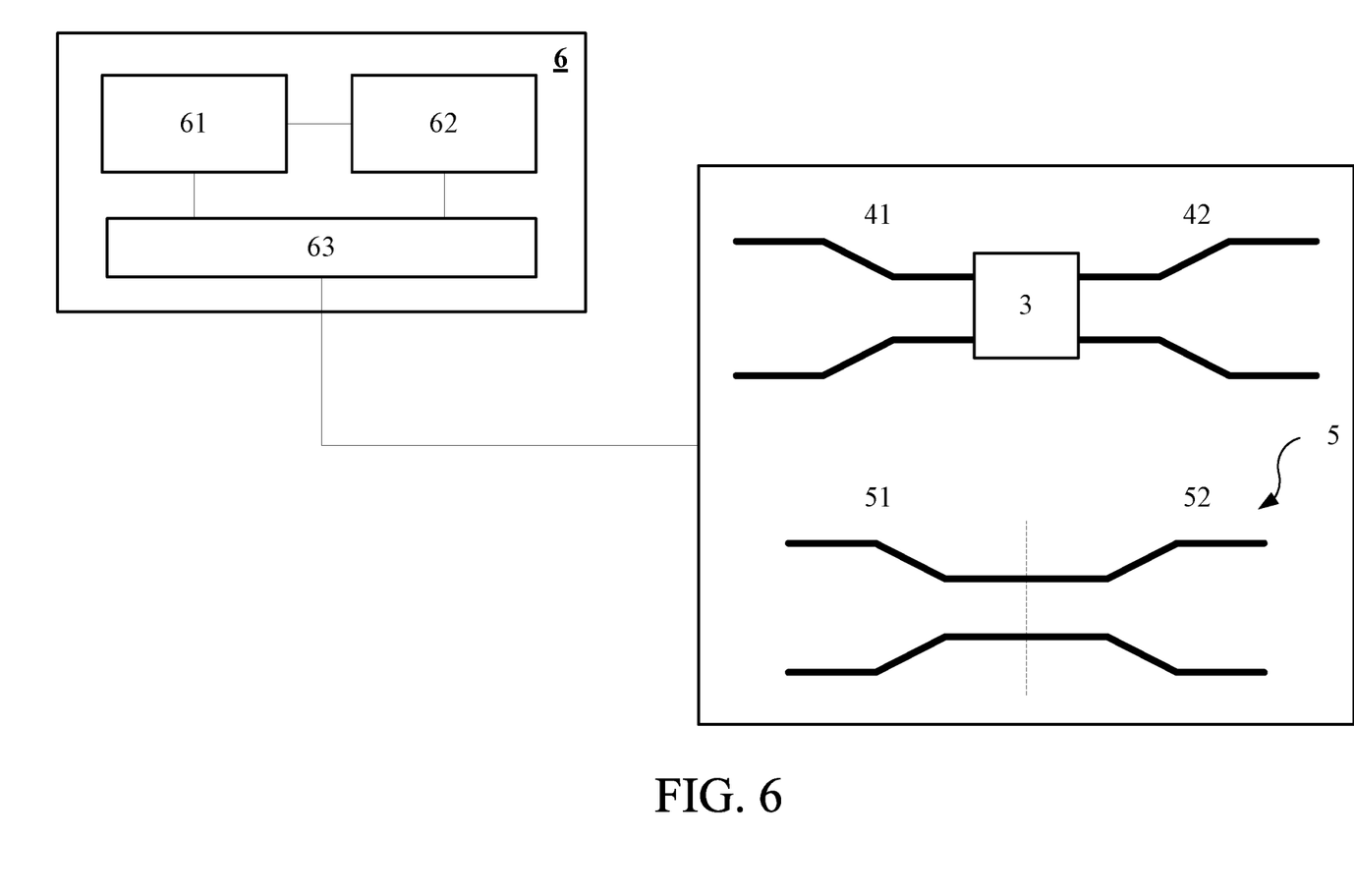
FIG. 6 is a schematic view of another fixture-effect removal device according to one or more embodiments of the present invention.

Referring to FIG. 6, a second embodiment of the present invention is a fixture-effect removal device 6, which may comprise a storage 61, a processor 62, and an input/output (I/O) interface 63. Every two among the storage 61, the processor 62 and the I/O interface 63 may be electrically connected with each other. The difference between the fixture-effect removal device 6 and the fixture-effect removal device 1 lies in that the fixture-effect removal device 6 may comprise all the functions originally performed by the fixture-effect removal device 1 and the test device 2, that is, the fixture-effect removal device 6 itself is a test device which is capable of performing all the functions of the fixture-effect removal device 1.

Accordingly, the storage 61 and the processor 62 may comprise all the functions and structures of the storage 11 and the processor 12 respectively, and may also comprise the corresponding functions performed by the processor and the storage in the test device 2. As shall be appreciated by those of ordinary skill in the art according to the above description of the test device 2, the above-mentioned functions of the test device 2 are executed by the storage, the processor or a combination thereof of the test device 2, and actions that can be executed by the storage 61 and the processor 62 shall also be appreciated from the above description and thus will not be further described herein.

The I/O interface 63 may be a collection of various types of data transmission interfaces, which may at least be electrically connected with the fixtures 41, 42, 51 and 52 so as to facilitate the transmission and reception of electrical signals to and from the fixtures by the test device 2 as described above. As a result, the processor 62 may generate the second set of S-parameters SS2 and the first set of S-parameters SS1 accordingly and finally further generate the set of target S-parameters TS1. Accordingly, the I/O interface 63 may comprise at least one of various test interfaces suitable for the DUT 3 in the network analyzer.

In addition, the I/O interface 63 may further comprise for example (but not limited to) USB (Class A, Class C, or other types of data buses), HDMI, RJ45 network ports, or possible combinations of the above elements. In some embodiments, after the processor 62 completes the actions corresponding to the processor 12 to generate the set of target S-parameters TS1, the processor 62 may output the set of target S-parameters TS1 to the user through the I/O interface 63, e.g., displaying the set of target S-parameters TS1 through a display device, playing sound through an audio device, and expressing information through a vibration device or the like.

According to the above descriptions, the fixture-effect removal device 1 and the fixture-effect removal device 6 provided according to the present invention only need a standard 2×-Thru calibration object for four-port fixture characterization, thereby saving the manufacturing and time cost of designing other calibration elements. In addition, because the calculation process is simple, the calculation speed may be improved accordingly, and the accuracy after embedding can also be preserved as compared to the prior art. The fixture-effect removal method provided according to the present invention may be applied to any test fixture in theory because the bandwidth limitation does not need to be considered in the processing flow.

Figure 7:
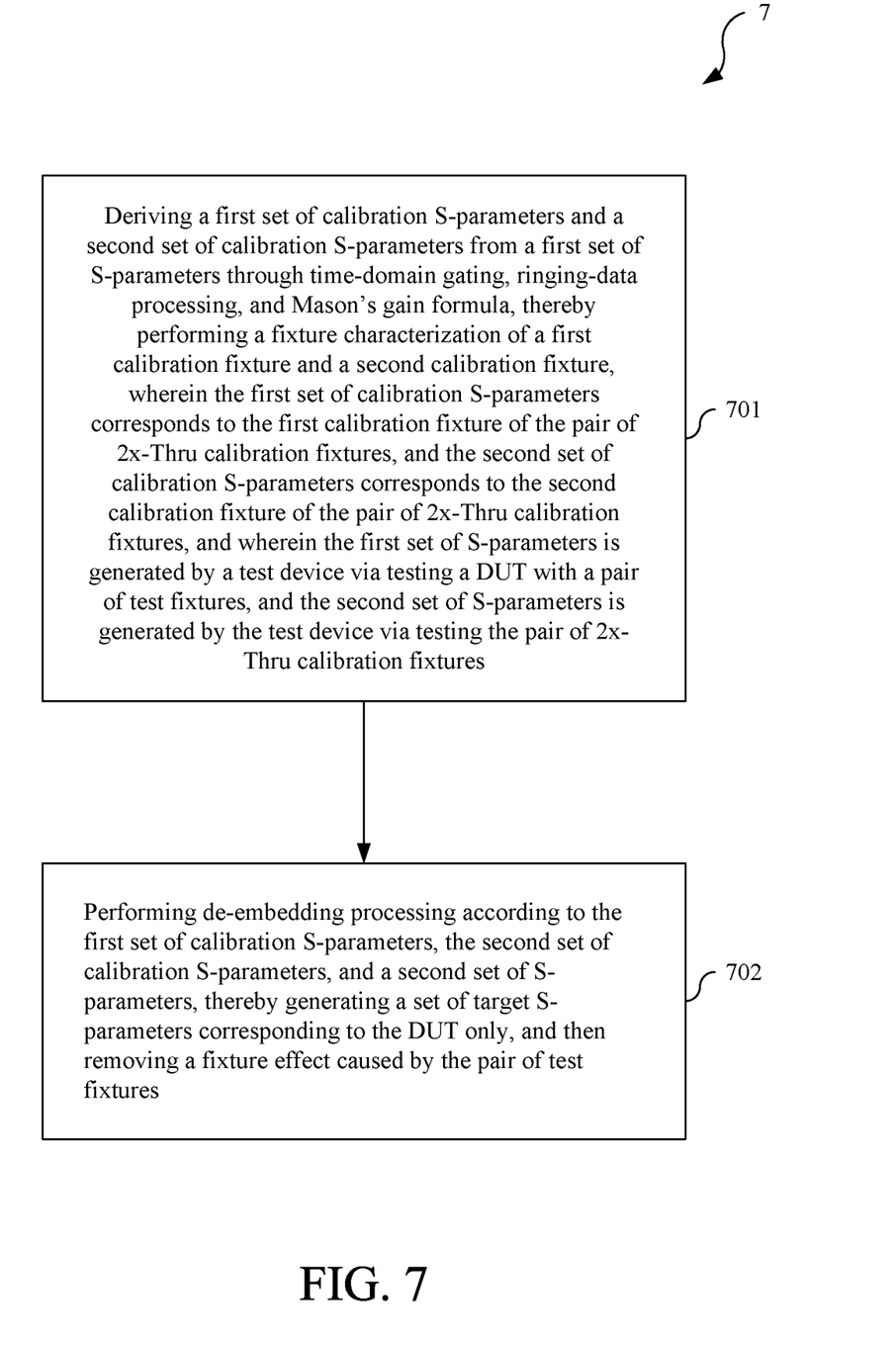
FIG. 7 is a flowchart diagram of a fixture-effect removal method according to one or more embodiments of the present invention.

Referring to FIG. 7, a third embodiment of the present invention is a fixture-effect removal method 7. The fixture-effect removal method 7 may be executed by an electronic device, the electronic device may store a first set of S-parameters and a second set of S-parameters, the first set of S-parameters is generated by a test device via testing a pair of 2×-Thru calibration fixtures, and the second set of S-parameters is generated by the test device via testing a DUT with a pair of test fixtures. Moreover, the fixture-effect removal method 7 may comprise the following steps:

deriving a first set of calibration S-parameters and a second set of calibration S-parameters from the first set of S-parameters through time-domain gating, ringing-data processing, and Mason's gain formula, thereby performing a fixture characterization of a first calibration fixture and a second calibration fixture, wherein the first set of calibration S-parameters corresponds to the first calibration fixture of the pair of 2×-Thru calibration fixtures, and the second set of calibration S-parameters corresponds to the second calibration fixture of the pair of 2×-Thru calibration fixtures (labeled as 701); and performing de-embedding processing according to the first set of calibration S-parameters, the second set of calibration S-parameters, and the second set of S-parameters, thereby generating a set of target S-parameters corresponding to the DUT only, and then removing a fixture effect caused by the pair of test fixtures (labeled as 702).

In some embodiments, the fixture-effect removal method 7 may further comprise the following steps: performing window processing in a frequency domain for a plurality of return-loss S-parameters and a plurality of insertion-loss S-parameters of the first set of S-parameters through an exponential window function before performing the fixture characterization, thereby enhancing the accuracy of time-domain response. In addition, in some embodiments, the first set of S-parameters may comprise sixteen single-ended mode S-parameters and sixteen mixed-mode S-parameters, and the plurality of return-loss S-parameters may comprise "$S_{11}$" and "$S_{22}$" parameters from the sixteen single-ended mode S-parameters, as well as "$S_{dd11}$", "$S_{dd22}$", "$S_{cc11}$", and "$S_{cc22}$" parameters from the sixteen mixed-mode S-parameters.

In some embodiments, the fixture-effect removal method 7 may further comprise the step of "performing window processing in a frequency domain for a plurality of return-loss S-parameters and a plurality of insertion-loss S-parameters of the first set of S-parameters through an exponential window function before performing the fixture characterization, thereby enhancing the accuracy of time-domain response". In addition, in some embodiments, when performing the fixture characterization by the electronic device, the fixture-effect removal method 7 may further comprise: a step of "converting the plurality of return-loss S-parameters and the plurality of insertion-loss S-parameters after the window processing in the frequency domain into time-domain voltages, thereby obtaining a plurality of return-loss impulse-response voltages, a plurality of insertion-loss impulse-response voltages, a plurality of first return-loss step-response voltages, and a plurality of insertion-loss step-response voltages"; a step of "determining a first time point corresponding to half the length of the pair of 2×-Thru calibration fixtures according to the plurality of insertion-loss impulse-response voltages"; a step of "converting the plurality of first return-loss step-response voltages into a plurality of first return-loss smooth step-response voltages and a plurality of first return-loss ringing step-response voltages"; a step of "performing the time-domain gating method and the window processing in the frequency domain, thereby converting the plurality of first return-loss smooth step-response voltages into a plurality of second return-loss smooth step-response voltages corresponding to the first time point"; a step of "performing ringing data processing, thereby converting the plurality of first return-loss ringing step-response voltages into a plurality of second return-loss ringing step-response voltages corresponding to the first time point"; a step of "adding the plurality of second return-loss smooth step-response voltages and the plurality of second return-loss ringing step-response voltages respectively to obtain the plurality of second return-loss step-response voltages corresponding to the first time point"; and a step of "performing differential arithmetic and Fourier transformation on the plurality of second return-loss step-response voltages to obtain a plurality of first target S-parameters corresponding to half the length of the pair of 2×-Thru calibration fixtures, wherein the set of target S-parameters comprises the plurality of first target parameters".

In addition to the above steps, in some embodiments, the fixture-effect removal method 7 may further comprise: a step of "smoothing the plurality of first return-loss step-response voltages via local regression fitting quadratic polynomial, thereby obtaining the plurality of first return-loss smooth step-response voltages corresponding thereto"; a step of "performing for the plurality of first return-loss smooth step-response voltages: differential operation, the window processing based on the plurality of insertion-loss step-response voltages, and integral operation, thereby generating the plurality of second return-loss smooth step-response voltages"; and a step of "subtracting the plurality of first return-loss smooth step-response voltages from the plurality of first return-loss step-response voltages, thereby obtaining the plurality of first return-loss ringing step-response voltages". However, in some other embodiments, the fixture-effect removal method 7 may further comprise a step of "calculating the S-parameters in the set of target S-parameters except for the plurality of first target S-parameters according to the Mason's gain formula and based on the plurality of first target S-parameters and the S-parameters in the first set of S-parameters except for the plurality of return-loss S-parameters".

In some embodiments, the fixture-effect removal method 7 may further comprise: a step of "receiving the second set of S-parameters and the first set of S-parameters from the test device"; and a step of "providing the set of target S-parameters for the test device". In some embodiments, with respect to the fixture-effect removal method 7, the test device may be a vector network analyzer. In addition, in some embodiments, the test device may be an original device integrated with the electronic device.

Each embodiment of the fixture-effect removal method 7 basically corresponds to a certain embodiment of the fixture-effect removal device 1 or the fixture-effect removal device 6. Therefore, all the corresponding embodiments of the fixture-effect removal method 7 shall be fully appreciated and implemented by those of ordinary skill in the art simply with reference to the above descriptions of the fixture-effect removal device 1 and the fixture-effect removal device 6, even though not all the embodiments of the fixture-effect removal method 7 are described in detail above.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A fixture-effect removal device, comprising:
a storage, being configured to store a first set of scattering parameters (S-parameters) and a second set of S-parameters, wherein the first set of S-parameters is generated by a test device via testing a pair of two-time through (2×-Thru) calibration fixtures, and the second set of S-parameters is generated by the test device via testing a device under test (DUT) with a pair of test fixtures; and
a processor, being electrically connected with the storage and configured to:
derive a first set of calibration S-parameters and a second set of calibration S-parameters from the first set of S-parameters through time-domain gating, ringing-data processing, and Mason's gain formula, thereby performing a fixture characterization of the first calibration fixture and the second calibration fixture, wherein the first set of calibration S-parameters corresponds to a first calibration fixture of the pair of 2×-Thru calibration fixtures, and the second set of calibration S-parameters corresponds to a second calibration fixture of the pair of 2×-Thru calibration fixtures, and
perform de-embedding processing according to the first set of calibration S-parameters, the second set of calibration S-parameters, and the second set of S-parameters, thereby generating a set of target S-parameters corresponding to the DUT only, and then removing a fixture effect caused by the pair of test fixtures.

2. The fixture-effect removal device of claim 1, wherein the processor is further configured to perform window processing in a frequency domain for a plurality of return-loss S-parameters and a plurality of insertion-loss S-parameters of the first set of S-parameters through an exponential window function before performing the fixture characterization, thereby enhancing the accuracy of time-domain response.

3. The fixture-effect removal device of claim 2, wherein the first set of scattering parameters comprises sixteen single-ended mode S-parameters and sixteen mixed-mode S-parameters, and the plurality of return-loss S-parameters comprise "S11" and "S22" parameters from the sixteen single-ended mode S-parameters, as well as "Sdd11", "Sdd22", "Scc11", and "Scc22" parameters from the sixteen mixed-mode S-parameters.

4. The fixture-effect removal device of claim 2, wherein the processor, when performing the fixture characterization, is further configured to:
convert the plurality of return-loss S-parameters and the plurality of insertion-loss S-parameters after the window processing in the frequency domain into time-domain voltages, thereby obtaining a plurality of return-loss impulse-response voltages, a plurality of insertion-loss impulse-response voltages, a plurality of first return-loss step-response voltages, and a plurality of insertion-loss step-response voltages;
determine a first time point corresponding to half the length of the pair of 2×-Thru calibration fixtures according to the plurality of insertion-loss impulse-response voltages;
convert the plurality of first return-loss step-response voltages into a plurality of first return-loss smooth step-response voltages and a plurality of first return-loss ringing step-response voltages;
perform the time-domain gating and the window processing in the frequency-domain, thereby converting the plurality of first return-loss smooth step-response voltages into a plurality of second return-loss smooth step-response voltages corresponding to the first time point;
perform ringing data processing, thereby converting the plurality of first return-loss ringing step-response voltages into a plurality of second return-loss ringing step-response voltages corresponding to the first time point;
add the plurality of second return-loss smooth step-response voltages and the plurality of second return-loss ringing step-response voltages respectively to obtain the plurality of second return-loss step-response voltages corresponding to the first time point; and
perform differential arithmetic and Fourier transformation on the plurality of second return-loss step-response voltages to obtain a plurality of first target S-parameters corresponding to half the length of the pair of 2×-Thru calibration fixtures, wherein the set of target S-parameters comprises the plurality of first target parameters.

5. The fixture-effect removal device of claim 4, wherein the processor is further configured to:
smooth the plurality of first return-loss step-response voltages via local regression fitting quadratic polynomial, thereby obtaining the plurality of first return-loss smooth step-response voltages corresponding thereto;
perform for the plurality of first return-loss smooth step-response voltages: differential operation, the window processing based on the plurality of insertion-loss step-response voltages, and integral operation, thereby generating the plurality of second return-loss smooth step-response voltages; and
subtract the plurality of first return-loss smooth step-response voltages from the plurality of first return-loss step-response voltages, thereby obtaining the plurality of first return-loss ringing step-response voltages.

6. The fixture-effect removal device of claim 4, wherein the processor is further configured to:
calculate the S-parameters in the set of target S-parameters except for the plurality of first target S-parameters according to the Mason's gain formula and based on the plurality of first target S-parameters and the S-parameters in the first set of S-parameters except for the plurality of return-loss S-parameters.

7. The fixture-effect removal device of claim 1, further comprising a transceiver, wherein the transceiver is electrically connected with the storage and the processor and configured to:
receive the second set of S-parameters and the first set of S-parameters from the test device; and
provide the set of target S-parameters for the test device.

8. The fixture-effect removal device of claim 1, wherein the test device is integrated with the fixture-effect removal device.

9. The fixture-effect removal device of claim 1, wherein the test device is a vector network analyzer.

10. A fixture-effect removal method, being executed by an electronic device, the electronic device storing a first set of scattering parameters (S-parameters) and a second set of S-parameters, the first set of S-parameters being generated by a test device via testing a pair of two-time through (2×-Thru) calibration fixtures, the second set of S-parameters being generated by the test device via testing a device under test (DUT) with a pair of test fixtures, the fixture-effect removal method comprising:
deriving a first set of calibration S-parameters and a second set of calibration S-parameters from the first set of S-parameters through time-domain gating, ringing-data processing, and Mason's gain formula, thereby performing a fixture characterization of the first calibration fixture and the second calibration fixture, wherein the first set of calibration S-parameters corresponds to a first calibration fixture of the pair of 2×-Thru calibration fixtures, and the second set of calibration S-parameters corresponds to a second calibration fixture of the pair of 2×-Thru calibration fixtures, and performing de-embedding processing according to the first set of calibration S-parameters, the second set of calibration S-parameters, and the second set of S-parameters, thereby generating a set of target S-parameters corresponding to the DUT only, and then removing a fixture effect caused by the pair of test fixtures.

11. The fixture-effect removal method of claim 10, further comprising:
performing window processing in a frequency domain for a plurality of return-loss S-parameters and a plurality of insertion-loss S-parameters of the first set of S-parameters through an exponential window function before performing the fixture characterization, thereby enhancing the accuracy of time-domain response.

12. The fixture-effect removal method of claim 11, wherein the first set of scattering parameters comprises sixteen single-ended mode S-parameters and sixteen mixed-mode S-parameters, and the plurality of return-loss S-parameters comprise "S11" and "S22" parameters from the sixteen single-ended mode S-parameters, as well as "Sdd11", "Sdd22", "Scc11", and "Scc22" parameters from the sixteen mixed-mode S-parameters.

13. The fixture-effect removal method of claim 11, wherein when performing the fixture characterization, the fixture-effect removal method further comprises:
converting the plurality of return-loss S-parameters and the plurality of insertion-loss S-parameters after the window processing in the frequency domain into time-domain voltages, thereby obtaining a plurality of return-loss impulse-response voltages, a plurality of insertion-loss impulse-response voltages, a plurality of first return-loss step-response voltages, and a plurality of insertion-loss step-response voltages;
determining a first time point corresponding to half the length of the pair of 2×-Thru calibration fixtures according to the plurality of insertion-loss impulse-response voltages;
converting the plurality of first return-loss step-response voltages into a plurality of first return-loss smooth step-response voltages and a plurality of first return-loss ringing step-response voltages;
performing the time-domain gating and the window processing in the frequency domain, thereby converting the plurality of first return-loss smooth step-response voltages into a plurality of second return-loss smooth step-response voltages corresponding to the first time point;
performing ringing data processing, thereby converting the plurality of first return-loss ringing step-response voltages into a plurality of second return-loss ringing step-response voltages corresponding to the first time point;
adding the plurality of second return-loss smooth step-response voltages and the plurality of second return-loss ringing step-response voltages respectively to obtain the plurality of second return-loss step-response voltages corresponding to the first time point; and
performing differential arithmetic and Fourier transformation on the plurality of second return-loss step-response voltages to obtain a plurality of first target S-parameters corresponding to half the length of the pair of 2×-Thru calibration fixtures, wherein the set of target S-parameters comprises the plurality of first target parameters.

14. The fixture-effect removal method of claim 13, further comprising:
smoothing the plurality of first return-loss step-response voltages via local regression fitting quadratic polynomial, thereby obtaining the plurality of first return-loss smooth step-response voltages corresponding thereto;
performing for the plurality of first return-loss smooth step-response voltages: differential operation, the window processing based on the plurality of insertion-loss step-response voltages, and integral operation, thereby generating the plurality of second return-loss smooth step-response voltages; and
subtracting the plurality of first return-loss smooth step-response voltages from the plurality of first return-loss step-response voltages, thereby obtaining the plurality of first return-loss ringing step-response voltages.

15. The fixture-effect removal method of claim 13, further comprising:
calculating the S-parameters in the set of target S-parameters except for the plurality of first target S-parameters according to the Mason's gain formula and based on the plurality of first target S-parameters and the S-parameters in the first set of S-parameters except for the plurality of return-loss S-parameters.

16. The fixture-effect removal method of claim 10, further comprising:
receiving the second set of S-parameters and the first set of S-parameters from the test device; and
providing the set of target S-parameters for the test device.

17. The fixture-effect removal method of claim 10, wherein the test device is integrated with the electronic device.

18. The fixture-effect removal method of claim 10, wherein the test device is a vector network analyzer.

* * * * *